(12) United States Patent
Okamoto

(10) Patent No.: US 10,907,042 B2
(45) Date of Patent: Feb. 2, 2021

(54) POLYAMIDE RESIN COMPOSITION, KIT, METHOD FOR MANUFACTURING MOLDED ARTICLE, AND MOLDED ARTICLE

(71) Applicant: MITSUBISHI ENGINEERING-PLASTICS CORPORATION, Tokyo (JP)

(72) Inventor: Fumihito Okamoto, Hiratsuka (JP)

(73) Assignee: MITSUBISHI ENGINEERING-PLASTICS CORPORATION, Tokyo (JP)

( * ) Notice: Subject to any disclaimer, the term of this patent is extended or adjusted under 35 U.S.C. 154(b) by 14 days.

(21) Appl. No.: 16/064,970

(22) PCT Filed: Nov. 28, 2016

(86) PCT No.: PCT/JP2016/085149
§ 371 (c)(1),
(2) Date: Jun. 21, 2018

(87) PCT Pub. No.: WO2017/110372
PCT Pub. Date: Jun. 29, 2017

(65) Prior Publication Data
US 2019/0002692 A1    Jan. 3, 2019

(30) Foreign Application Priority Data
Dec. 25, 2015    (JP) .................... 2015-254960

(51) Int. Cl.
| | | |
|---|---|---|
| C08L 77/06 | (2006.01) |
| C08G 69/26 | (2006.01) |
| C08K 7/14 | (2006.01) |
| B29C 65/16 | (2006.01) |
| B29C 65/00 | (2006.01) |
| B29C 65/82 | (2006.01) |
| C08K 5/00 | (2006.01) |
| C08K 3/34 | (2006.01) |
| G03B 17/02 | (2006.01) |

(52) U.S. Cl.
CPC .............. *C08L 77/06* (2013.01); *B29C 65/16* (2013.01); *B29C 65/1616* (2013.01); *B29C 65/1635* (2013.01); *B29C 65/1654* (2013.01); *B29C 65/1677* (2013.01); *B29C 65/8215* (2013.01); *B29C 66/1122* (2013.01); *B29C 66/43* (2013.01); *B29C 66/7212* (2013.01); *B29C 66/73321* (2013.01); *C08G 69/26* (2013.01); *C08K 5/0041* (2013.01); *C08K 7/14* (2013.01); *B29C 66/71* (2013.01); *B29C 66/919* (2013.01); *B29C 66/929* (2013.01); *B29C 66/939* (2013.01); *C08K 3/34* (2013.01); *C08L 2203/206* (2013.01); *G03B 17/02* (2013.01)

(58) Field of Classification Search
None
See application file for complete search history.

(56) References Cited

U.S. PATENT DOCUMENTS

| | | | |
|---|---|---|---|
| 2003/0065074 A1* | 4/2003 | Koshida ............... | B29C 65/1635 524/358 |
| 2003/0125429 A1 | 7/2003 | Joachimi et al. | |
| 2003/0130381 A1 | 7/2003 | Joachimi et al. | |
| 2010/0186886 A1 | 7/2010 | Kihara et al. | |
| 2012/0172512 A1* | 7/2012 | Ishii ................... | C08L 25/18 524/405 |
| 2012/0276390 A1 | 11/2012 | Ji et al. | |
| 2013/0123439 A1* | 5/2013 | Mitadera ............ | C08G 69/26 525/92 B |
| 2016/0125429 A1 | 5/2016 | Fanning | |

FOREIGN PATENT DOCUMENTS

| | | |
|---|---|---|
| CN | 102575100 A | 7/2012 |
| EP | 1258506 A1 | 11/2002 |
| EP | 1306404 A1 | 5/2003 |
| EP | 1353991 B1 | 6/2006 |
| EP | 1769899 A1 | 4/2007 |
| EP | 1939254 A1 | 7/2008 |
| EP | 3012298 A1 | 4/2016 |
| JP | 44-2584 B1 | 2/1969 |
| JP | 60-20975 A | 2/1985 |
| JP | 2003-517078 A | 5/2003 |
| JP | 2003-183524 A | 7/2003 |
| JP | 2005-213500 A | 8/2005 |
| JP | 2005-213501 A | 8/2005 |
| JP | 2007-112127 A | 5/2007 |
| JP | 2008-266434 A | 11/2008 |
| JP | 2008-308526 A | 12/2008 |

(Continued)

OTHER PUBLICATIONS

International Preliminary Report on Patentability and Written Opinion of the International Searching Authority(Forms PCT/IB/373, PCT/ISA/210 and PCT/ISA/237), dated Jun. 26, 2018, for International Application No. PCT/JP2016/085149, with an English Translation of the Written Opinion.

International Search Report (Form PCT/ISA/210), dated Jan. 10, 2017, for International Application No. PCT/JP2016/085149.

Third Party Observation (Form PCT/IB/345), dated Apr. 3, 2018, for International Application No. PCT/JP2016/085149.

Third Party Observation (Form PCT/IB/345), dated Apr. 4, 2018, for International Application No. PCT/JP2016/085149.

(Continued)

*Primary Examiner* — Christopher M Rodd

(74) *Attorney, Agent, or Firm* — Birch, Stewart, Kolasch & Birch, LLP

(57) ABSTRACT

Provided is a polyamide resin composition that has a large light transmittance with respect to 940 nm laser beam, and is capable of yielding a molded article that is highly laser weldable; and a kit, a method for manufacturing a molded article, and a molded article, using such polyamide resin composition.

9 Claims, 1 Drawing Sheet

(56) References Cited

FOREIGN PATENT DOCUMENTS

| | | | |
|---|---|---|---|
| JP | 2010-513054 A | 4/2010 | |
| JP | 2012-62417 A | 3/2012 | |
| JP | 2013-155278 A | 8/2013 | |
| JP | 2014-58604 A | 4/2014 | |
| JP | 2014-74150 A | 4/2014 | |
| WO | WO 01/44357 A1 | 6/2001 | |
| WO | WO 01/44363 A1 | 6/2001 | |
| WO | WO 2007/034970 A1 | 3/2007 | |
| WO | WO 2007/046536 A1 | 4/2007 | |
| WO | WO 2011/030911 A1 | 3/2011 | |
| WO | WO 2012/056416 A1 | 5/2012 | |
| WO | WO 2014/203811 A1 | 12/2014 | |

OTHER PUBLICATIONS

Extended European Search Report, dated Jul. 4, 2019, for corresponding European Application No. 16878266.2.

Japanese Office Action dated Jul. 14, 2020 for JP Application No. 2017-557815 with English Machine Translation.

Chinese Office Action and Search Report for corresponding Chinese Application No. 201680074862.6, dated Mar. 31, 2020, with an English translation.

Notificaton of Written Submission by Third Party dated Jan. 14, 2020 for corresponding Japanese Patent Application No. 2017-557815 with a English machine translation.

Chinese Office Action dated Nov. 4, 2020 for CN Application No. 201660074862.6 with English Translation.

\* cited by examiner

POLYAMIDE RESIN COMPOSITION, KIT, METHOD FOR MANUFACTURING MOLDED ARTICLE, AND MOLDED ARTICLE

TECHNICAL FIELD

This invention relates to a polyamide resin composition. This invention also relates to a kit that includes a polyamide resin composition and a light absorptive resin composition. This invention further relates to a molded article using the polyamide resin composition or the kit; and a method for manufacturing the same. The polyamide resin composition of this invention is mainly used for a resin composition which is used for a transmission side of laser beam for welding (light transmissive resin composition).

BACKGROUND ART

Polyamide resin, which is a representative engineering plastic, is easy to process, excels in mechanical properties, electrical characteristics, heat resistance and other physicochemical properties, and is therefore widely applied to vehicle parts, electric/electronic device parts, and other precision equipment parts. In recent years, many of intricately shaped parts have increasingly been manufactured using polyamide resin. A variety of welding techniques have been applied to bond parts having hollow portions, such as intake manifold for example. The techniques include adhesive welding, vibration welding, ultrasonic welding, hotplate welding, injection welding, and laser welding.

The adhesive welding, however, suffers from causing a large time loss due to curing, and peripheral pollution or other environmental load. The ultrasonic welding and hot plate welding have been concerned about possibility of damaging the products due to vibration or heat, or necessity of post-treatment due to generation of abrasion powder or burr. The injection welding often needs specialized dies or molding machine, and has been anticipated that it would be disabled unless the material is highly fluidic.

Meanwhile, the laser welding is a method for bonding resin parts that include a laser light transmissive (in other words, non-light absorptive or weakly-light absorptive) resin member, and a laser light absorptive resin member (occasionally referred to as an "absorptive resin member"), by bringing them into contact, and then welding them. More specifically, laser beam is irradiated from behind, and through, the light transmissive resin member, on the bonding plane, so as to melt the absorbing resin that composes the bonding plane by the energy of laser beam, and to allow them to weld. The laser welding is unlikely to produce abrasion powder or burr, and less damaging the products. Moreover, since polyamide resin per se is a material with a relatively high laser transmittance, so that processing of polyamide resin by laser welding has recently attracted much attention.

The light transmissive resin member is usually obtained by molding a light transmissive resin composition. As this sort of light transmissive resin composition, Patent Literature 1 describes a polyamide resin composition for laser welding, the composition containing 100 parts by weight of (A) polyamide resin, and added thereto 1 to 150 parts by weight of (B) reinforcing filler whose refractive index at 23° C. is 1.560 to 1.600, wherein at least one type of monomer that composes at least one type of (A) polyamide resin has an aromatic ring. Example in Patent Literature 1 discloses a resin composition that includes a blend of polyamide MXD6 or polyamide 6I/6T, with polyamide 66 or polyamide 6; a glass fiber; and a colorant. According to Example in Patent Literature 1, the glass fiber accounts for approximately 30% by weight of the polyamide resin composition.

Patent Literature 2 discloses a polyamide molding compound having components below:
(a) 20 to 99% by weight of at least one type of polyamides;
(b) 0.05 to 5% by weight of nigrosin;
(c) 0.005 to 2% by weight of at least one type of nucleating agent; and
(d) 0 to 79.945% by weight of at least one type of additive or supplement, wherein the components (a) to (d) totals 100% by weight of the polyamide molding compound, and, carbon black being not a component of the polyamide molding compound.

Example of Patent Literature 2 discloses a polyamide molding compound that contains a blend of polyamide 66 and polyamide 6 as the polyamide resin, and various additives and nigrosin added thereto. In the Example of Patent Literature 2, the glass fiber accounts for 30% by weight of the polyamide molding compound.

CITATION LIST

Patent Literature

[Patent Literature 1] JP-A-2008-308526
[Patent Literature 2] JP-A-2014-74150

SUMMARY OF THE INVENTION

Technical Problem

The light transmissive resin composition intended for laser welding needs to be highly weldable by laser. Since the smaller the laser output, the higher the productivity, so that the light transmissive resin member needs to have a large light transmittance. It is particularly important for the member to have a large light transmittance with respect to 940 nm laser beam used for laser welding.

It is therefore an object of this invention to solve these problems, and to provide a polyamide resin composition that has a large light transmittance with respect to 940 nm laser beam, and is capable of yielding a molded article that is highly laser weldable; and a kit, a method for manufacturing a molded article, and a molded article, using such polyamide resin composition.

Solution to Problem

Investigations conducted by the present inventors under such circumstances revealed that a molded article, having a large light transmittance and excels in laser weldability, may be obtained by using a particular xylylenediamine-based polyamide resin specially selected from polyamide resins, and by controlling the content of glass fiber to 40 to 70% by weight. The findings led us to complete this invention. More specifically, the problems were solved by means <1> below, and preferably by means <2> to <10> below.

<1> A polyamide resin composition comprising: 25.0 to 59.95% by weight of polyamide resin that is composed of a dicarboxylic acid-derived structural unit and a diamine-derived structural unit, 70 mol % or more of the diamine-derived structural unit being derived from xylylenediamine, and 70 mol % or more of the dicarboxylic acid-derived structural unit being derived from aliphatic dicarboxylic acid having 9 to 18 carbon atoms; 40 to 70% by weight of a glass fiber; and a light transmissive colorant, the polyamide resin composition having a light transmittance at 800 nm, measured according to ISO 13468-1 and ISO 13468-2, of 48% or larger, and a light transmittance at 1064 nm of 55% or larger.

<2> The polyamide resin composition of <1>, wherein the light transmissive colorant accounts for 0.05 to 5.0% by weight of the polyamide resin composition.

<3> The polyamide resin composition of <1> or <2>, wherein the glass fiber accounts for 40 to 60% by weight.

<4> The polyamide resin composition of any one of <1> to <3>, wherein the xylylenediamine contains paraxylylenediamine.

<5> The polyamide resin composition of any one of <1> to <4>, wherein the aliphatic dicarboxylic acid having 9 to 18 carbon atoms is sebacic acid.

<6> The polyamide resin composition of any one of <1> to <3>, wherein the xylylenediamine contains paraxylylenediamine, and the aliphatic dicarboxylic acid having 9 to 18 carbon atoms is sebacic acid.

<7> The polyamide resin composition of any one of <1> to <6>, further comprising talc.

<8> A kit comprising: the polyamide resin composition described in any one of <1> to <7>; and a light absorptive resin composition that contains a thermoplastic resin and a light absorptive colorant.

<9> A method for manufacturing a molded article, the method comprising welding, by laser welding, a molded article molded from the polyamide resin composition described in any one of <1> to <7>, with a molded article molded from a light absorptive resin composition that contains a thermoplastic resin and a light absorptive colorant.

<10> A molded article molded from the polyamide resin composition described in any one of <1> to <7>, or, molded from the kit described in <8>.

Advantageous Effects of Invention

According to this invention, it now became possible to provide a polyamide resin composition that has a large light transmittance with respect to 940 nm laser beam, and is capable of yielding a molded article that is highly laser weldable; and a kit using the same; and a method for manufacturing a molded article, and a molded article, all using the same.

DESCRIPTION OF EMBODIMENTS

Figure 1:
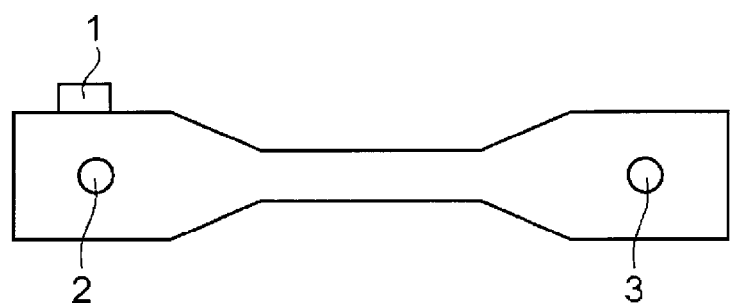
FIG. 1 is a schematic drawing illustrating a test piece used for measuring light transmittance in Example of this invention.

This invention will be detailed below. Note that all numerical ranges given in this specification, using "to" preceded and succeeded by numerals, are used to represent the ranges including these numerals respectively as the lower and upper limit values.

The polyamide resin composition of this invention includes 25.0 to 59.95% by weight of polyamide resin that is composed of a dicarboxylic acid-derived structural unit and a diamine-derived structural unit, 70 mol % or more of the diamine-derived structural unit being derived from xylylenediamine, and 70 mol % or more of the dicarboxylic acid-derived structural unit being derived from aliphatic dicarboxylic acid having 9 to 18 carbon atoms; 40 to 70% by weight of a glass fiber; and a light transmissive colorant, the polyamide resin composition having a light transmittance at 800 nm, measured according to ISO 13468-1 and ISO 13468-2, of 48% or larger, and a light transmittance at 1064 nm of 55% or larger.

With such design, obtainable is a molded article having a large light transmittance and excels in laser weldability. The molded article thus having a large light transmittance and thus excels in the laser weldability is suitably applicable to the light transmissive resin member in laser welding.

Now the light transmittance of the polyamide resin composition measured according to ISO 13468-1 and ISO 13468-2 means light transmittance of an 1 m-thick molded article of the polyamide resin composition measured according to ISO 13468-1 and ISO 13468-2, more specifically according to a method described later in EXAMPLES. If the instrument described later in EXAMPLES were no more available due to discontinuation or for other reason, other instrument with equivalent performances will suffice.

The light transmittance of the polyamide resin composition, measured according to ISO 13468-1 and ISO 13468-2, is preferably 50% or larger at 800 nm, and 58% or larger at 1064 nm; and more preferably 55% or larger at 800 nm, and 60% or larger at 1064 nm. The upper limit values of the light transmittance are not specifically limited. The effects of this invention are also expectable when the light transmittance at 800 nm is 65% or smaller, and even 60% or smaller, and, the light transmittance at 1064 nm is 70% or smaller, and even 65% or smaller.

The polyamide resin composition also preferably shows a light transmittance or 55% or larger at both of near-gate point and a far-gate point, when measured according to ISO 13468-1 and ISO 13468-2 at 940 nm. The upper limit value is not specifically limited, and a value of 70% or smaller, for example, will suffice for demonstrating the effects of this invention.

<Polyamide Resin>

The polyamide resin (occasionally be referred to as "specific polyamide resin", hereinafter) used as an essential component in this invention is composed of a dicarboxylic acid-derived structural unit and a diamine-derived structural unit, wherein 70 mol % or more of the diamine-derived structural unit is derived from xylylenediamine, and 70 mol % or more of the dicarboxylic acid-derived structural unit is derived from an aliphatic dicarboxylic acid having 9 to 18 carbon atoms.

Now, " . . . is composed of a dicarboxylic acid-derived structural unit and a diamine-derived structural unit" means that each amide bond that composes the specific polyamide resin is formed by a bond between a dicarboxylic acid and a diamine. The specific polyamide resin can therefore contain a structural unit other than the dicarboxylic acid-derived structural unit and the diamine-derived structural unit, and can contain a moiety other than the terminal groups. It would even contain trace additives or impurities. The polyamide resin used in this invention preferably such that the dicarboxylic acid-derived structural unit or the diamine-derived structural unit accounts for 95% by weight or more.

In the specific polyamide resin, 70 mol % or more of the diamine-derived structural unit is derived from xylylenediamine, which is more preferably 80 mol % or more, and even more preferably 90 mol % or more.

The xylylenediamine may be metaxylylenediamine, may be paraxylylenediamine, or may be a mixture of them, and preferably contains at least paraxylylenediamine.

In the specific polyamide resin, 30 to 100 mol % of the diamine-derived structural unit is preferably derived from paraxylylenediamine, which is more preferably 50 to 100 mol %, even more preferably 50 to 90 mol %, and yet more preferably 55 to 80 mol %. As for the residual structural unit derived from diamine component, 0 to 70 mol % thereof is preferably derived from metaxylylenediamine, which is more preferably 0 to 50 mol %, even more preferably 10 to 50 mol %, and yet more preferably 20 to 45 mol %.

The diamine other than xylylenediamine may be an aromatic diamine or aliphatic diamine. The straight chain or branched aliphatic diamine is exemplified by tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, and 2,4,4-trimethylhexamethylenediamine.

The alicyclic diamine is exemplified by 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane.

The aromatic diamine is exemplified by bis(4-aminophenyl)ether, paraphenylenediamine, and bis(aminomethyl)naphthalene.

In the specific polyamide resin, the number of types of diamine may be one, or two or more.

In the specific polyamide resin, 70 mol % or more of the dicarboxylic acid-derived structural unit is derived from the aliphatic dicarboxylic acid having 9 to 18 carbon atoms, which is more preferably 80 mol % or more, and even more preferably 90 mol % or more.

The aliphatic dicarboxylic acid having 9 to 18 carbon atoms may be a straight chain aliphatic dicarboxylic acid having 9 to 18 carbon atoms, or may be a cyclic structure-containing aliphatic dicarboxylic acid having 9 to 18 carbon atoms. In this invention, the aliphatic dicarboxylic acid having 9 to 18 carbon atoms is preferably a straight chain aliphatic α,ω-dicarboxylic acid having 9 to 18 carbon atoms; more preferably sebacic acid, azelaic acid, dodecanedioic acid, or eicosanedioic acid; and particularly sebacic acid. Dicarboxylic acid other than the aliphatic dicarboxylic acid having 9 to 18 carbon atoms is preferably an aliphatic dicarboxylic acid and aromatic dicarboxylic acid, having 8 or less carbon atoms. Specific examples include adipic acid, terephthalic acid, isophthalic acid, 2-chloroterephthalic acid, suberic acid, sodium 5-sulfoisophthalate, hexahydroterephthalic acid, and hexahydroisophthalic acid.

In the specific polyamide resin, the number of types of dicarboxylic acid may be one, or two or more.

The specific polyamide resin is specifically exemplified by the polyamide resin described in JP-A-2014-145004, and particularly by those corresponded to the specific polyamide resin. Meta/paraxylylene sebacamide (polyamide MP10), paraxylylene sebacamide (polyamide PXD10), and polymetaxylylene dodecamide are preferable. In this invention, these polyamide homopolymers or copolymers may be used independently, or in the form of mixtures.

The specific polyamide resin preferably has a glass transition point of 40 to 180° C., which is more preferably 60 to 130° C.

The specific polyamide resin preferably has a number-average molecular weight of 5,000 to 45,000, which is more preferably 10,000 to 25,000.

The specific polyamide resin preferably has a melting point of 170° C. or higher, which is more preferably 180 to 300° C.

The specific polyamide resin preferably has a terminal carboxy group concentration of 50 to 200 micro equivalent/g, which is more preferably 60 to 150 micro equivalent/g.

In the polyamide resin composition of this invention, the content of specific polyamide resin is preferably 25.0% by weight or above, more preferably 29.95% by weight or above, even more preferably 35.0% by weight or above, and may also be 40.0% by weight or above. Meanwhile the content is preferably 59.95% by weight or below, more preferably 54.95% by weight or below, even more preferably less than 50% by weight, and yet more preferably 49.95% by weight or below. Within these ranges, the polyamide resin composition of this invention will tend to have improved mechanical strength. Only one type, or two or more types of the specific polyamide resins may be contained. When two or more types are contained, the total content preferably falls within the above described ranges.

<Other Polyamide Resin>

The polyamide resin composition of this invention may contain a polyamide resin other than the specific polyamide resin.

Examples of such other polyamide resin includes various polyamide resins such as polycondensate of lactams, polycondensate of diamine and aliphatic dicarboxylic acid having 8 or less carbon atoms, polycondensate of diamine and aromatic dicarboxylic acid, and polycondensate of w-aminocarboxylic acid; or, polyamide resins obtained by copolymerizing them.

The lactam used as a starting material for polycondensation of polyamide resin is exemplified by ε-caprolactam and ω-laurolactam.

The diamine is exemplified by those described above in relation to the specific polyamide resin.

The aliphatic dicarboxylic acid having 8 or less carbon atoms is exemplified by malonic acid, succinic acid, glutaric acid, adipic acid, and suberic acid.

Specific examples of the polycondensate of diamine and aliphatic dicarboxylic acid having 8 or less carbon atoms include polyamide resin that is composed of a dicarboxylic acid-derived structural unit and a diamine-derived structural unit, in which 70 mol % or more of the diamine-derived structural unit is derived from xylylenediamine, and 70 mol % or more of the dicarboxylic acid-derived structural unit is derived from aliphatic dicarboxylic acid having 8 or less carbon atoms.

When such other polyamide resin is added to the polyamide resin composition of this invention, the content thereof is preferably 0.5 to 50% by weight of the total polyamide resins contained in the polyamide resin composition of this invention. In this invention, the light transmissive colorant is preferably added in the form of master batch as described later, wherein the amount of addition of such other polyamide resin is preferably 0.5 to 5% by weight, and more preferably 0.8 to 3% by weight.

<Other Resin Component>

The polyamide resin composition of this invention may contain some other resin component other than the polyamide resin.

Such other resin employable herein includes thermoplastic resins including as polyester resins such as polyethylene terephthalate and polybutylene terephthalate, and polycarbonate resin, and polyacetal resin.

The polyamide resin composition of this invention may be composed so as to contain substantially no resin component other than the polyamide resin, wherein the content thereof may be 5% by weight or less of the total resin components contained in the polyamide resin composition, 1% by weight or less, and 0.4% by weight or less.

<Glass Fiber>

The polyamide resin composition of this invention contains a glass fiber.

The glass fiber has a composition of A-glass, C-glass, E-glass, S-glass or the like. E-glass (non-alkali glass) is particularly preferable.

The glass fiber used for the polyamide resin composition of this invention may be a single yarn, or a twisted yarn having a plurality of single yarns twisted therein.

Available forms of the glass fiber include "glass roving" which is a continuous spool of a single yarn or a twisted yarn, "chopped strand" cut into a uniform length of 1 to 10 mm, and "milled fiber" milled into a size of 10 to 500 μm or around, any of these forms will suffice. These forms of glass fiber are marketed under the trade names of "Glasron Choppoed Strand" and "Grasron Milled Fiber" from Asahi Fiber Glass Co., Ltd., which are easily available. Different forms of glass fiber may be combined.

In this invention, also the glass fiber having modified cross sectional shape may preferably be used. The modified cross sectional shape is preferably depicted by an oblateness of typically 1.5 to 10, preferably 2.5 to 10, more preferably 2.5 to 8, and particularly 2.5 to 5, where the oblateness is given by the ratio (D2/D1) of long diameter D2 and short diameter D1 measured over a cross section taken perpendicularly to the longitudinal direction of fiber. As for such oblate glass, the description in paragraphs [0065] to [0072] of JP-A-2011-195820 may be referred to, the contents of which are incorporated by reference into this specification.

The glass fiber in this invention may be a glass bead. The glass bead means a spherical article 10 to 100 μm in outer diameter. This is marketed, for example, under the trade name of "EGB731" from Potters-Ballotini Co., Ltd., which is easily available. Meanwhile, the glass flake means a scaly article 1 to 20 μm in thickness, and 0.05 to 1 mm in length of one side. This is marketed, for example, under the trade name of "Fleka" from Nippon Sheet Glass Co., Ltd., which is easily available.

The glass fiber used in this invention preferably has a weight-average fiber diameter of 1 to 20 μm, and a cut length of 1 to 10 mm. When the glass fiber has an oblate cross section, the weight-average fiber diameter is calculated as the one assuming a circular cross section of the same area.

The glass fiber used in this invention may be sized using a sizing agent. The sizing agent in this case is preferably an acid-based sizing agent.

The content of glass fiber in the polyamide resin composition of this invention is 40% by weight or more and 70% by weight or less of the polyamide resin composition, and is preferably 45% by weight or more of the polyamide resin composition. The upper limit value is preferably 65% by weight or below, more preferably 60% by weight or below, and even more preferably 55% by weight or below. The polyamide resin composition of this invention may contain only a single type of glass fiber, or may contain two or more types. When two or more types are contained, the total content preferably falls within the above described ranges.

In this invention, the light transmittance at 940 nm may further be improved, by controlling the amount of addition of the glass fiber to 40% by weight or more. Many of polyamide resins show a general tendency such that the lesser the content of glass fiber, the higher the light transmittance. In contrast, the polyamide resin composition used in this invention shows an extraordinary tendency such that the more the content of glass fiber, the higher the light transmittance.

<Light Transmissive Colorant>

The light transmissive colorant used in this invention is blended so that the composition of this invention shows, when measured according to ISO 13468-1 and ISO 13468-2, a light transmittance at 800 nm of 48% or larger, and a light transmittance at 1064 nm of 55% or larger; preferably a light transmittance at 800 nm of 50% or larger, and a light transmittance at 1064 nm of 58% or larger; and more preferably a light transmittance at 800 nm of 55% or larger, and a light transmittance at 1064 nm of 60% or larger. Although the upper limit of these light transmittance values are not specifically limited, the effect of this invention is well demonstrated when the light transmittance at 800 nm is 65% or smaller, and even 60% or smaller; and the light transmittance at 1064 nm is 70% or smaller, and even 65% or smaller.

The composition of this invention also preferably has a reflectance of 5% or larger and smaller than 13%, both at 800 nm and 1064 nm.

The light transmissive colorant used in this invention is typically a black colorant that satisfies the above-described characteristics, and is specifically exemplified by nigrosin, naphthalocyanine, aniline black, phthalocyanine, porphyrin, perylene, quaterrylene, azo dye, anthraquinone, squaric acid derivative, and immonium dye.

Commercially available products include e-BIND ACW-9871, e-BIND LTW-8731H, and e-BIND LTW-8701H, which are colorants from Orient Chemical Industries, Co., Ltd. Also employable is a black colorant having two or more types of chromatic colorants mixed therein.

Content of the light transmissive colorant in the polyamide resin composition of this invention is preferably 0.05 to 5.0% by weight of the composition, more preferably 0.4 to 2.0% by weight, and even more preferably 0.7 to 2.0% by weight. Only one type, or two or more types of the light transmissive colorants may be contained. When two or more types are contained, the total content preferably falls within the above-described ranges.

The polyamide resin composition of this invention preferably contains substantially no carbon black. Moreover, the polyamide resin composition of this invention also preferably contains substantially no light absorptive colorant. The phrase " . . . contains substantially no . . . " means, for example, that the content is 0.0001 by weight or less of the polyamide resin composition.

<Talc>

The thermoplastic resin composition of the present invention may further contain talc. By mixing the talc, crystallization may be accelerated.

The amount of talc contained in the polyamide resin composition of the present invention is preferably 0.05 to 20 parts by weight, more preferably 0.1 to 10 parts by weight, even more preferably 0.15 to 5 parts by weight, and particularly preferably 0.2 to 1.0 parts by weight per 100 parts by weight of the polyamide resin compositions. Only one type, or two or more types of the Talc may be contained. When two or more types are contained, the total content preferably falls within the above described ranges.

<Mold Releasing Agent>

The polyamide resin composition used in this invention may contain a mold releasing agent. Aliphatic carboxylic acid, aliphatic carboxylic acid salt, ester of aliphatic carboxylic acid and alcohol, aliphatic hydrocarbon compound having a number-average molecular weight of 200 to 15,000, and polysiloxane based silicone oil are exemplified.

As the aliphatic carboxylic acid, for example, saturated or unsaturated monovalent, divalent, and trivalent carboxylic acids are exemplified. It is noted that the aliphatic carboxylic acids includes alicyclic carboxylic acid. Among these, preferable carboxylic acid is monovalent or divalent carboxylic acid having 6 to 36 carbon atoms, more preferably aliphatic monovalent carboxylic acid having 6 to 36 carbon atoms. Examples of such aliphatic carboxylic acid include palmitic acid, stearic acid, caproic acid, capric acid, lauric acid, archaic acid, behenic acid, lignoceric acid, cerotic acid, melissic acid, tetratriacontanoic acid, montanic acid, adipic acid, azelaic acid and the like. And examples of aliphatic carboxylic acid salt include sodium salt, potassium salt, calcium salt, magnesium salt and the like.

As an aliphatic carboxylic acid in the ester of aliphatic carboxylic acid and alcohol, for example, aliphatic carboxylic acid as mentioned above may be used. Meanwhile, examples of alcohol include saturated or unsaturated monohydric or polyhydric alcohol and the like. These alcohols may have substituent such as fluorine atom or aryl group. Among these, monohydric or polyhydric saturated alcohol having 30 or less carbon atoms are preferable, saturated or unsaturated aliphatic or alicyclic monohydric or polyhydric alcohol having 30 or less carbon atoms are more preferable.

Specific examples of such alcohol include octanol, decanol, dodecanol, stearyl alcohol, behenyl alcohol, ethyleneglycol, diethyleneglycol, glycerine, pentaerythritol, 2,2-dihydroxy perfluoro propanol, neopentyl glycol, ditrymethylol propane, dipentaerythritol and the like.

Specific examples of ester of aliphatic carboxylic acid and alcohol include beeswax (a mixture containing millicyl palmitate as a main component), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritoltristearate, pentaerythritol tetrastearate and the like.

As examples of aliphatic hydrocarbon having a number average molecular weight of 200 to 15,000, liquid paraffin, paraffin wax, micro wax, polyethylene wax, Fischer-Tropsch wax, α-olefin oligomer having 3 to 12 carbon atoms. It is noted that the aliphatic hydrocarbons also include alicyclic hydrocarbons. And, number average molecular weight of aliphatic hydrocarbon is preferably 5,000 or less.

Among these, paraffin wax, polyethylene wax, or partially oxidized polyethylene wax are preferable, paraffin wax, or polyethylene wax are more preferable.

For the case where the polyamide resin composition of this invention contains the mold releasing agent, the content of mold releasing agent is preferably 0.001 to 2% by weight of the polyamide resin composition, which is more preferably 0.01 to 1% by weight. Only one type, or two or more types of the mold releasing agent may be contained. When two or more types are contained, the total content preferably falls within the above-described ranges. If the content of mold releasing agent is below the lower limit value of the above-described range, the mold releasing effect would be insufficient, meanwhile, if the content exceeds the upper limit value of the above-described range, hydrolysis resistance would degrade, and dies would be polluted in the process of injection molding.

<Other Ingredients>

The polyamide resin composition of this invention may contain some other ingredients. Such other ingredients are exemplified by filler other than glass fiber, light stabilizer, antioxidant, flame retarder, UV absorber, fluorescent brightener, anti-dripping agent, antistatic agent, anti-clouding agent, lubricant, anti-blocking agent, fluidity modifier, plasticizer, dispersion aid, and antibacterial agent. Only one type of these ingredients may be used independently, or two or more types may be used in a combined manner.

In the polyamide resin composition of this invention, amounts of addition of the resin component, the glass fiber, the light transmissive colorant, and the other additives are adjusted to be totaled 100% by weight.

<Method for Manufacturing Polyamide Resin Composition>

The method for manufacturing a polyamide resin composition of this invention is preferably, but not restrictively, conducted by using, as a kneader, a single-screw or twin screw extruder equipped with a vent allowed for degassing. The polyamide resin, the glass fiber and the other optional additives may be fed to the kneader en bloc, or the other ingredients may sequentially be added to the polyamide resin. The glass fiber is preferably fed halfway on the path of the extruder, so as to prevent the reinforcing filler from being crushed during kneading. Alternatively, two or more ingredients selected from all ingredients may preliminarily be mixed or kneaded. For example, the polyamide resin composition of this invention may also be obtained by preliminarily preparing a master batch of nigrosin with a thermoplastic resin, then by mixing and kneading the master batch with the residual ingredients in a molten state according to a predetermined mixing ratio, followed by extrusion. The thermoplastic resin used for the master batch is preferably a polyamide resin. The polyamide resin used for the master batch may be the above-described specific polyamide resin, or may be some other polyamide resin, which is exemplified by polyamide 6 and polyamide 66. A preferred embodiment of the polyamide resin composition of this invention relates to usage of a master batch of a light transmissive colorant with polyamide 66.

A method for manufacturing a molded article using the polyamide resin composition of this invention is not specifically limited, to which any methods having been widely applied to process thermoplastic resins may be employed. That is, applicable are molding methods such as injection molding, hollow molding, extrusion molding, press forming and so forth. In this invention, injection molding is particularly preferable for its good fluidity. In injection molding, the resin temperature is preferably controlled to 250 to 300° C.

<Kit>

This invention also discloses a kit that contains the above-described polyamide resin composition, and alight absorptive resin composition that includes a thermoplastic resin and a light absorptive colorant. The kit of this invention is preferably used for manufacture of a molded article based on laser welding.

More specifically, the polyamide resin composition contained in the kit plays a role as a transmissive resin composition, and the molded article molded from the light transmissive resin composition will serve as a laser light transmissive resin member in laser welding. Meanwhile, a molded article molded from a light absorptive resin composition will serve as a laser-absorptive resin member in laser welding.

<<Light Absorptive Resin Composition>>

The light absorptive resin composition used in this invention may contain the thermoplastic resin and the light absorptive dye, and may further contain an inorganic filler.

The thermoplastic resin is exemplified by polyamide resin, olefin resin, vinyl-based resin, styrene-based resin, acrylic resin, polyphenylene ether resin, polyester resin, polycarbonate resin, and polyacetal resin. From the viewpoint of compatibility with the polyamide resin composition, particularly preferable is polyamide resin, polyester resin and polycarbonate resin, and further preferable is polyamide resin. Only a single type, or two or more types of thermoplastic resins may be used.

The polyamide resin used for the light absorptive resin composition is not specifically limited in types, for which the above-described specific polyamide resin and other polyamide resin are preferably used, which is exemplified by the above-described specific polyamide resin, and polycondensate of diamine and aliphatic dicarboxylic acid having 8 or less carbon atoms. The polyamide resin used for the light absorptive resin composition is more preferably at least one resin selected from the above-described specific polyamide resin; and, a polyamide resin that is composed of a dicarboxylic acid-derived structural unit and a diamine-derived structural unit, wherein 70 mol % or more of the diamine-derived structural unit is derived from xylylenediamine, and 70 mol % or more of the dicarboxylic acid-derived structural unit is derived from an aliphatic dicarboxylic acid having 8 or less carbon atoms. The above-described specific polyamide resin is more preferable.

In this invention, the resin component contained in the light absorptive resin composition and the resin component contained in the light transmissive resin composition are preferably common as much as 90% by weight or more.

The inorganic filler is exemplified by laser-absorbing fillers such as glass fiber, carbon fiber, silica, alumina, talc, carbon black, and inorganic powder coated with a laser-absorbing material. Glass fiber is preferable. The glass fiber is synonymous to the glass fiber used for the above-described polyamide resin composition of this invention, with the same preferred ranges.

The light absorptive colorant is defined by a light absorptive colorant having absorption within the wavelength range of laser to be irradiated, which ranges from 800 nm to 1064 nm in this invention, and is exemplified by inorganic pigments [black pigment such as carbon black (acetylene black, lamp black, thermal black, furnace black, channel black, Ketchenblack, etc.), red pigment such as red iron oxide, orange pigment such as molybdate orange, white pigment such as titanium oxide]; and organic pigment (yellow pigment, orange pigment, red pigment, blue pigment, green pigment, etc.). Among them, the inorganic pigments are preferable for their strong concealability as a whole. Black pigment is more preferable. The light absorptive colorant, which is pigment in particular, is preferably added in the form of master batch, from the viewpoint of improving the dispersibility. The master batch of carbon black is exemplified by PA-0896A from NIKKO BICS Co., Ltd. (a master batch containing 50% by weight of carbon black).

Two or more types of these light absorptive dyes may be used in a combined manner. The amount of addition of light absorptive dye is preferably 0.01 to 1 part by weight, per 100 parts by weight of the resin component.

<<Method for Laser Welding>>

Next, a method for laser welding will be explained. In this invention, a molded article may be manufactured by welding a molded article (light transmissive resin member) molded from the polyamide resin composition of this invention, and a molded article (absorptive resin member) molded from the above-described light absorptive resin composition, by laser welding. By laser welding, the light transmissive resin member and the absorptive resin member may be bonded tightly without using an adhesive.

Although geometries of the members are not specifically limited, they usually contain at least (flat or curved) portions allowed for surface contact, since the members are used after bonded by laser welding. In laser welding, a laser beam coming through the light transmissive resin member is absorbed by the absorptive resin member so as to melt it, and thereby both members are welded. Since the molded article of the polyamide resin composition of this invention is highly light transmissive despite the glass fiber contained therein, so that it may suitably be used as the light transmissive resin member. The thickness of a member through which the laser beam passes (the thickness in the direction of laser transmission at a portion where the laser beam passes through) is properly determined, taking applications, compositional ratio of the polyamide resin composition and so forth into consideration. The thickness is typically 5 mm or thinner, and preferably 4 mm or thinner.

The laser beam source used for laser welding is selectable depending on species of light corresponding to the light absorptive colorant. Lasers of 800 to 1064 nm are preferable, and semiconductor laser may be used.

More specifically, in the process of welding of the light transmissive resin member and the absorptive resin member, the portions to be bonded of both members are first brought into contact. Such portions to be bonded are preferably brought into surface contact, in which both surfaces may be flat, curved, or combination of flat and curved surfaces. Next, the laser beam is irradiated from behind the light transmissive resin member (preferably at an angle 85 to 95° away from the surface to be welded). The laser beam in this case may be converged optionally through a lens system to the interface between both members. The thus converged beam passes through the light transmissive resin member, absorbed in the surfacial portion of the absorptive resin member, and produces heat to melt it. The thus produced heat is then allowed to conduct also to the light transmissive resin member to melt it, and forms a molten pool at the interface of both members. The both members are bonded after cooled.

The molded article thus obtained by welding the light transmissive resin member and the absorptive resin member has high bonding strength. Note that the molded article in the context of this invention conceptually includes not only final products or parts, but also covers members that compose parts of them.

The molded article of this invention obtained by laser welding enjoys high mechanical strength, high welding strength, and less damage of resin due to laser irradiation, and may be put into various applications including various preserving containers, electric/electronic equipment parts, office automation (OA) equipment parts, home appliance parts, mechanical mechanism parts and vehicle mechanism parts. The molded article is particularly suitable for food containers, medicine containers, oil and fat product containers, vehicle hollow parts (various tanks, intake manifold parts, camera housing, etc.), vehicle electrical components (various control units, ignition coil parts, etc.), motor component, various sensor parts, connector parts, switch parts, breaker parts, relay parts, coil parts, transformer parts, and lamp parts. In particular, the polyamide resin composition and the kit of this invention are suitable for housings of vehicle-borne cameras.

EXAMPLES

This invention will be explained more specifically below, referring to Examples. Note that types of materials, amount of consumption, ratio, details of processes, and procedures of processes described in Examples may properly be modified, without departing from the spirit of this invention. This invention is, therefore, not limited to the specific Examples below.

<Resins>

MP10-1: Obtained by a Synthetic Method as Described Below.

Sebacic acid was melted under heating in a reaction can with a nitrogen atmosphere, kept stirred, and heated up to 235° C., during which a mixed diamine containing paraxylylenediamine (from Mitsubishi Gas Chemical Company, Inc.) and metaxylylenediamine (from Mitsubishi Gas Chemical Company, Inc.) with a molar ratio of 7:3 was slowly added dropwise under pressure (0.35 MPa), so as to attain a molar ratio of diamine and sebacic acid to approximately 1:1. Upon completion of the dropwise addition, the reaction was allowed to continue for 60 minutes to thereby control the content of a component having a molecular weight of 1,000 or smaller. Upon completion of the reaction, the content was taken out in the form of strands, and then pelletized using a pelletizer, to obtain the polyamide resin.

MP10-2: Obtained by a Synthetic Method as Described Below.

All were conducted in the same way as in the synthesis of MP10-1, except that the molar ratio of paraxylylenediamine (from Mitsubishi Gas Chemical Company, Inc.) and metaxylylenediamine (from Mitsubishi Gas Chemical Company, Inc.) was set to 6:4, to obtain the polyamide resin.

MXD6: Metaxylylene adipamide resin 56001, from Mitsubishi Gas Chemical Company, Inc.

PA66: Polyamide 66, "CM3001-N (trade name)" from Toray Industries, Inc., melting point is 265° C., relative viscosity is 2.95

<Glass Fiber>

296GH: "ECSO3T-296GH (trade name)" from Nippon Electric Glass Co., Ltd., weight-average fiber diameter falls into 9.5 to 10.5 μm, cut length is 3 mm <Light Transmissive Colorant>

8731H: "e-BIND LTW-8731H (trade name)" from Orient Chemical Industries, Co., Ltd., master batch of light transmissive colorant in polyamide 66 (50% by weight of light transmissive colorant) 8701H: "e IND LTW-8701H (trade name)" from Orient Chemical Industries, Co., Ltd., master batch of light transmissive colorant in polyamide 66 (50% by weight of translucent dye)

<Light Absorptive Colorant>

Carbon black (MA600B, from Mitsubishi Chemical Corporation)

<Talc>

Micron White #5000S, from Hayashi Kasei Co., Ltd.

<Mold Releasing Agent>

Light Amide WH255, from Kyoeisha Chemical Co., Ltd.

Example 1

<<Compound>>

According to the compositional ratio listed in Table below, a resin, talc, a mold releasing agent, and a light transmissive colorant were individually weighed, dry-blended, and fed into a twin screw extruder (TEM26SS, from Toshiba Machine Co., Ltd.) from the base of the screws, using a twin screw-type cassette weighing feeder (CE-W-1-MP, from Kubota Corporation). Meanwhile, the glass fiber was fed into the above-described twin screw extruder from the side, using a vibration-type cassette weighing feeder (CE-V-1B-MP, from Kubota Corporation), melt-kneaded with the resin component and so forth, and resin composition pellets were fed. Temperature of the extruder was set to 280° C.

<<Light Transmittance>>

The light transmittance was measured according ISO 13468-1 and ISO 13468-2. More specifically, the thus obtained resin composition pellets were dried at 120° C. for 5 hours, and then processed using an injection molding machine ("Model SE-50D", from Sumitomo Heavy Industries, Ltd.), at a cylinder temperature of 280° C. and at a die surface temperature of 110° C., to produce a test piece (ASTM type 4 dumbbell test piece, 1.0 mm thick) as schematically illustrated in FIG. 1, intended for use in measurement of light transmittance. As illustrated in FIG. 1, the test piece has a gate 1 at one end. Light transmittance was measured individually at a near-gate measuring point 2 and a far-gate measuring point 3 illustrated in FIG. 1, using a visible/UV spectrophotometer ("UV-3100PC", from Shimadzu Corporation) at 800 nm, 940 nm and 1064 nm. As for the light transmittance at 800 nm and light transmittance at 1064 nm, employed was the near-gate light transmittance or the far-gate light transmittance, whichever is lower. The light transmittance at 940 nm was evaluated based on the near-gate light transmittance and the far-gate light transmittance as below.

<<<Light Transmittance at 940 nm>>>

Ranks of Evaluation are as Below.

A: Both of near-gate and far-gate light transmittance values are 55% or larger.

B: One of near-gate and far-gate light transmittance values is 55% or larger.

C: Both of near-gate and far-gate light transmittance values are smaller than 55%.

<<Laser Weldability>>

The thus obtained resin composition pellets were dried at 120° C. for 5 hours, and then processed using an injection molding machine ("Model SG-75MIII", from Sumitomo Heavy Industries, Ltd.), at a cylinder temperature of 280° C. and at a die surface temperature of 110° C., to produce a test piece-1 (light transmissive resin member) of 20 mm wide, 126 mm long and 1.0 mm thick.

Also the composition for producing the absorptive resin member listed in Table was mixed in the same way as the above-described resin composition pellets to produce a compound, and is further injection-molded to produce a test piece-2 (absorptive resin member) of 20 mm wide, 126 mm long and 1.0 mm thick.

Figure 2:
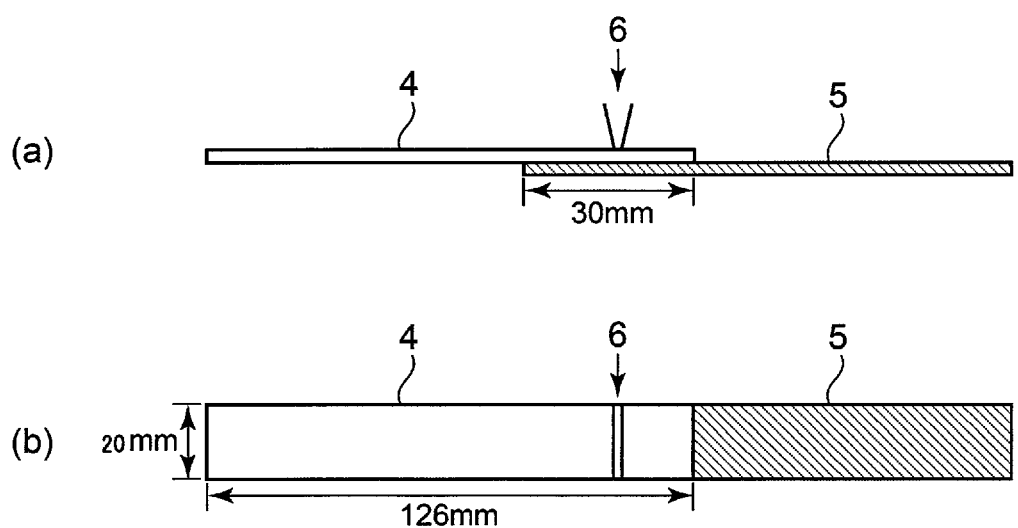
FIG. 2 is a schematic drawing illustrating a method for measuring laser weldability in Example of this invention.

The test pieces were overlapped as illustrated in FIG. 2, and irradiated with laser beam. In FIG. 2, (a) is a side view of the test pieces, and (b) is a top view of the test pieces. Reference numeral 4 represents the test piece-1, reference numeral 5 represents the test piece-2, and reference numeral 6 represents a point of laser irradiation.

The test piece-1 and the test piece-2 were overlapped, and laser beam was irradiated from behind the test piece-1. Using a scanning-type laser welding apparatus "PARK LASER SYSTEM" from Parker Corporation Inc., laser beam of 940 nm (semiconductor laser) was irradiated with a welding spot diameter of 2.0 mm and welding length of 20 mm, at a laser scanning speed of 5 mm/sec, a laser output of 13 W, and a clamping pressure of 0.5 MPa.

Using the thus welded test pieces, laser weld strength was measured. Using a tensile tester ("Model 5544", from Instron), the thus welded and integrated test piece-1 and test piece-2 were held with clamps at both ends in the longitudinal direction, and pulled at a tensile speed of 5 mm/min. The weld parts were evaluated as below based on the tensile shear strength.
A: Weld part having tensile shear strength of 800 N or larger.
B: Weld part having tensile shear strength of 100 N or larger and smaller than 800 N.
C: Weld part having tensile shear strength of smaller than 100 N.

Example 2

All conducted in the same way as in Example 1, except for the recipe changed as listed in Table 1.

Example 3

All conducted in the same way as in Example 1, except for the recipe changed as listed in Table 1.

Example 4

All conducted in the same way as in Example 1, except for the recipe changed as listed in Table 1.

Comparative Example 1

All conducted in the same way as in Example 1, except for the recipe changed as listed in Table 1, and the die surface temperature changed to 100° C.

Comparative Example 2

All conducted in the same way as in Example 1, except for the recipe changed as listed in Table 1, but extrusion molding was not successful.

Comparative Example 3

All conducted in the same way as in Example 1, except for the recipe changed as listed in Table 1.

As is clear from the results above, the polyamide resin compositions of this invention were found to have high light transmittance values at 940 nm, and, excel in laser weldability (Examples 1 to 4). Hence, even a low laser output will suffice for proper laser welding.

In contrast, when polyamide 66, having widely been used for laser welding, was used as the polyamide resin (Comparative Example 1), the laser weldability was found to be considerably degraded.

When the amount of polyamide resin fell outside the range of this invention, the composition was not extruded (Comparative Example 2).

Also when the type of polyamide resin fell outside the scope of this invention, the light transmissive resin member was found to have low light transmittance, and to show poor laser weldability (Comparative Example 3).

In addition, the polyamide resin composition of this invention is allowed for larger content of glass fiber, and can therefore yield a molded article having improved mechanical strength.

REFERENCE SIGNS LIST 1 gate
2 near-gate measuring point
3 far-gate measuring point
4 test piece-1
5 test piece-2
6 point of laser irradiation

The invention claimed is:
1. A polyamide resin composition to be laser welded comprising:
25.0 to 59.95% by weight of polyamide resin that is composed of a dicarboxylic acid-derived structural unit and a diamine-derived structural unit, 70 mol % or more of the diamine-derived structural unit being derived from xylylenediamine, and 70 mol % or more of the dicarboxylic acid-derived structural unit being derived from sebacic acid;

TABLE 1

| | | | Example 1 | Example 2 | Example 3 | Example 4 | Comparative Example 1 | Comparative Example 2 | Comparative Example 3 |
|---|---|---|---|---|---|---|---|---|---|
| Transmissive Resin Member | Resins | MP10-1 | 46.4 | 46.4 | | 46.4 | | 16.4 | |
| | | MP10-2 | | | 46.4 | | | | |
| | | MXD6 | | | | | | | 46.4 |
| | | PA66 | | | | | 46.4 | | |
| | Glass Fiber | 296GH | 50.0 | 50.0 | 50.0 | 50.0 | 50.0 | 80.0 | 50.0 |
| | Talc | Micron White #5000S | 0.3 | 0.3 | 0.3 | 0.3 | 0.3 | 0.3 | 0.3 |
| | Mold Releasing Agent | Light Amide WH255 | 0.3 | 0.3 | 0.3 | 0.3 | 0.3 | 0.3 | 0.3 |
| | Light Transmissive Resin | 8731H | 3.0 | | 3.0 | 3.0 | 3.0 | 3.0 | 3.0 |
| | | 8701H | | 3.0 | | | | | |
| Light Transmittance of Transmissive Resin (%) | | Wavelength 800 nm | 58 | 58 | 55 | 58 | 47 | Not extruded | 50 |
| | | Wavelength 940 nm | A | A | A | A | C | | C |
| | | Wavelength 1064 nm | 62 | 62 | 59 | 62 | 52 | | 55 |
| Absorbing Resin Member | Resins | MP10-1 | 48.1 | 48.1 | | | | Not molded | |
| | | MP10-2 | | | 48.1 | | | | |
| | | MXD6 | | | | 48.1 | | | 48.1 |
| | | PA66 | | | | | 48.1 | | |
| | Glass Fiber | 296GH | 50 | 50 | 50 | 50 | 50 | | 50 |
| | Tarc | Micron White #5000S | 0.3 | 0.3 | 0.3 | 0.3 | 0.3 | | 0.3 |
| | Mold Releasing Agent | Light Amide WH255 | 0.3 | 0.3 | 0.3 | 0.3 | 0.3 | | 0.3 |
| | Light Absorbing Colorang | Carbon black | 1.3 | 1.3 | 1.3 | 1.3 | 1.3 | | 1.3 |
| | | Laser Weldability | A | A | A | A | C | | B |

40 to 70% by weight of a glass fiber; and a light transmissive colorant comprising a black colorant, the polyamide resin composition having a light transmittance at 800 nm, measured according to ISO 13468-1 and ISO 13468-2, of 48% or larger, and a light transmittance at 1064 nm of 55% or larger;

the light transmissive colorant is 0.05 to 5.0% by weight of the polyamide resin composition;

the xylylenediamine is a mixture of paraxylylenediamine and metaxylylenediamine; and the polyamide resin composition contains talc in an amount of 0.05 to 5 parts by weight per 100 parts by weight of the polyamide resin composition.

2. The polyamide resin composition to be laser welded of claim 1, wherein the glass fiber accounts for 40 to 60% by weight.

3. A kit comprising:

the polyamide resin composition to be laser welded described in claim 1; and a light absorptive resin composition that contains a thermoplastic resin and a light absorptive colorant.

4. The kit in claim 3, wherein;

the glass fiber accounts for 40 to 60% by weight of the polyamide resin composition to be laser welded.

5. The kit in claim 3, wherein a resin component contained in the polyamide resin composition to be laser welded and a resin component contained in the light absorptive resin composition are common as much as 90% by weight or more.

6. A method for manufacturing a molded article, the method comprising welding, by laser welding, a molded article molded from the polyamide resin composition to be laser welded described in claim 1, with a molded article molded from a light absorptive resin composition that contains a thermoplastic resin and a light absorptive colorant.

7. The method for manufacturing a molded article in claim 6, wherein the glass fiber accounts for 40 to 60% by weight of the polyamide resin composition to be laser welded.

8. A molded article molded from the polyamide resin composition to be laser welded described in claim 1.

9. A camera housing composed of a laser light transmissive resin member and a laser light absorptive resin member, wherein the laser light transmissive resin member is obtained by the polyamide resin composition to be laser welded described in claim 1.

* * * * *